(12) United States Patent
Peterson et al.

(10) Patent No.: US 8,676,457 B2
(45) Date of Patent: Mar. 18, 2014

(54) SYSTEM AND METHOD FOR CONTROLLING ENGINE TORQUE LOAD

(75) Inventors: Grant Steven Peterson, Metamora, IL (US); Randall Todd Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 13/438,026

(22) Filed: Apr. 3, 2012

(65) Prior Publication Data

US 2013/0190996 A1    Jul. 25, 2013

Related U.S. Application Data

(60) Provisional application No. 61/588,907, filed on Jan. 20, 2012.

(51) Int. Cl.
*G06F 7/00* (2006.01)
(52) U.S. Cl.
USPC .................................................. 701/54
(58) Field of Classification Search
USPC .............................. 701/54; 172/1
See application file for complete search history.

(56) References Cited

U.S. PATENT DOCUMENTS

| | | | |
|---|---|---|---|
| 6,385,970 B1 | 5/2002 | Kuras et al. | |
| 6,675,577 B2 | 1/2004 | Evans | |
| 6,782,868 B1 | 8/2004 | Doering | |
| 7,549,287 B2 | 6/2009 | Foster et al. | |
| 7,795,752 B2 | 9/2010 | Gorman et al. | |
| 7,810,323 B2 | 10/2010 | Iwamoto | |
| 7,894,963 B2 | 2/2011 | Shenoy et al. | |
| 8,200,400 B2* | 6/2012 | Filla | 701/50 |
| 8,439,012 B2* | 5/2013 | Martin et al. | 123/399 |
| 2009/0319136 A1 | 12/2009 | Anderson et al. | |
| 2010/0036568 A1* | 2/2010 | Filla | 701/50 |
| 2010/0089050 A1* | 4/2010 | Filla | 60/433 |
| 2012/0138016 A1* | 6/2012 | Martin et al. | 123/406.23 |

FOREIGN PATENT DOCUMENTS

| | | |
|---|---|---|
| JP | 2010159722 | 7/2010 |
| WO | 2009145706 | 12/2009 |

* cited by examiner

*Primary Examiner* — Yonel Beaulieu
(74) *Attorney, Agent, or Firm* — Liell & McNeil

(57) ABSTRACT

A machine includes a plurality of torque consuming devices drivingly coupled with an internal combustion engine. The plurality of torque consuming devices includes a continuously variable transmission coupling the internal combustion engine with a plurality of ground engaging elements. An electronic controller is in communication with the internal combustion engine and the plurality of torque consuming devices and is configured to execute a torque load control algorithm for generating a torque load limit based, at least in part, on an engine underspeed value. The electronic controller identifies a potential engine stall event during which a current engine speed of the internal combustion engine drops below the engine underspeed value by a predetermined amount, and executes a transient torque load control algorithm to adjust the torque load limit responsive to the identification of the potential engine stall event.

20 Claims, 6 Drawing Sheets

| | | Engine Underspeed Value 114 | | | | | 110 |
|---|---|---|---|---|---|---|---|
| | | 750 | 900 | 1100 | 1350 | 1650 | |
| 116 | 0.1 | 535 | 690 | 800 | 900 | 970 | |
| | 0.2 | 560 | 720 | 840 | 925 | 990 | |
| | 0.3 | 590 | 755 | 865 | 975 | 1000 | |
| | 0.4 | 610 | 765 | 895 | 1000 | 1025 | |
| Actual Gear Ratio | 0.5 | 625 | 775 | 910 | 1015 | 1075 | |
| | 0.6 | 635 | 780 | 920 | 1030 | 1080 | |
| | 0.8 | 640 | 785 | 925 | 1045 | 1090 | |
| | 1 | 645 | 790 | 925 | 1050 | 1100 | |
| | 1.2 | 645 | 790 | 925 | 1050 | 1200 | |

Fig.6

| | | Engine Underspeed Value 124 | | | | | 120 |
|---|---|---|---|---|---|---|---|
| | | 750 | 900 | 1100 | 1350 | 1650 | |
| 126 | 0.1 | 425 | 600 | 650 | 675 | 675 | |
| | 0.2 | 425 | 595 | 625 | 650 | 650 | |
| | 0.3 | 400 | 500 | 515 | 550 | 550 | |
| | 0.4 | 380 | 400 | 450 | 450 | 450 | |
| Actual Gear Ratio | 0.5 | 375 | 375 | 400 | 400 | 400 | |
| | 0.6 | 375 | 375 | 375 | 375 | 375 | |
| | 0.8 | 350 | 350 | 350 | 350 | 350 | |
| | 1 | 350 | 350 | 350 | 350 | 350 | |
| | 1.2 | 345 | 345 | 345 | 345 | 345 | |

Fig.7

| | | Engine Underspeed Value 134 | | | | | 130 |
|---|---|---|---|---|---|---|---|
| | | 750 | 900 | 1100 | 1350 | 1650 | |
| 136 | 0.1 | 625 | 800 | 945 | 1100 | 1110 | |
| | 0.2 | 670 | 810 | 970 | 1120 | 1190 | |
| | 0.3 | 700 | 820 | 975 | 1130 | 1200 | |
| | 0.4 | 710 | 825 | 990 | 1140 | 1220 | |
| Actual Gear Ratio | 0.5 | 715 | 830 | 1000 | 1155 | 1240 | |
| | 0.6 | 715 | 835 | 1010 | 1185 | 1280 | |
| | 0.8 | 715 | 840 | 1015 | 1200 | 1290 | |
| | 1 | 715 | 840 | 1015 | 1200 | 1290 | |
| | 1.2 | 715 | 840 | 1015 | 1200 | 1290 | |

Fig.8

| Engine Underspeed Value | 750 | 925 | 950 | 1000 | 1100 |
|---|---|---|---|---|---|
| Maximum Rate Limit | 380 | 380 | 25 | 10 | 5 |

Fig.9

| Engine Underspeed Value | 750 | 900 | 1200 | 1400 | 1600 |
|---|---|---|---|---|---|
| Torque Limit Rate Limit | 0.65 | 0.65 | 0.85 | 1 | 1 |

Fig.10

| Engine Underspeed Value | 750 | 900 | 1200 | 1400 | 1600 |
|---|---|---|---|---|---|
| Torque Limit Rate Limit | 0.25 | 0.35 | 0.45 | 0.9 | 1 |

Fig.11

SYSTEM AND METHOD FOR CONTROLLING ENGINE TORQUE LOAD

RELATION TO OTHER PATENT APPLICATION

This application claims priority to provisional patent application 61/588,907, filed Jan. 20, 2012, and entitled "Engine Stall Prevention."

TECHNICAL FIELD

The present disclosure relates generally to a system and method for controlling engine torque load in a machine having a continuously variable transmission, and more particularly to a control system and method for adjusting torque load limits during a potential engine stall event.

BACKGROUND

Many machines, including off-highway machines such as, for example, loaders, graders, excavators, and dozers, utilize numerous devices and/or systems that receive power from a main power source, such as an internal combustion engine. For example, many machines commonly include engine driven pumps that provide high pressure fluid to operate an implement system of the machine. In particular, a loader may use high pressure fluid to move actuators associated with a bucket of the loader. In addition, many machines utilize continuously variable transmissions that use engine driven pumps for providing high pressure fluid to drive ground engaging elements, such as wheels, of the machine. As the power requested from these engine powered systems increases, the speed of the engine may begin to decrease. If the engine speed falls below a threshold value, the engine may be susceptible to stalling.

By setting limits on machine operation so that the engine speed does not fall below the threshold speed, engine stalling may be avoided and/or reduced. For example, U.S Patent Application Publication No. 2009/0319136 to Anderson et al. teaches a system and method for calculating torque load limits and controlling the distribution of engine torque in order to maintain the engine speed above the underspeed value and, thus, reduce stalling. Although the Anderson et al. reference may sufficiently reduce engine stalling during the majority of the operation of the machine, there may be certain operating scenarios or conditions, including high transient load conditions, during which engine stall may still occur.

The present disclosure is directed to one or more of the problems or issues set forth above.

SUMMARY OF THE DISCLOSURE

In one aspect, a machine includes a plurality of torque consuming devices drivingly coupled with an internal combustion engine. The plurality of torque consuming devices includes a continuously variable transmission coupling the internal combustion engine with a plurality of ground engaging elements. An electronic controller is in communication with the internal combustion engine and the plurality of torque consuming devices and is configured to execute a torque load control algorithm for generating a torque load limit based, at least in part, on an engine underspeed value. The electronic controller identifies a potential engine stall event during which a current engine speed of the internal combustion engine drops below the engine underspeed value by a predetermined amount, and executes a transient torque load control algorithm to adjust the torque load limit responsive to the identification of the potential engine stall event.

In another aspect, a computer readable medium for use by a control system for a machine has executable instructions for performing a method of controlling engine torque load. The method includes a step of executing a torque load control algorithm for generating a torque load limit based, at least in part, on an engine underspeed value. The method also includes identifying a potential engine stall event during which a current engine speed of the internal combustion engine drops below the engine underspeed value by a predetermined amount, and executing a transient torque load control algorithm to adjust the torque load limit responsive to the identification of the potential engine stall event.

In yet another aspect, a method of controlling engine torque load on an internal combustion engine includes steps of generating a torque load limit signal based, at least in part, on an engine underspeed value, and controlling at least one of the internal combustion engine and a plurality of torque consuming devices drivingly coupled with the internal combustion engine based on the torque load limit signal to regulate the engine torque load on the internal combustion engine. The method also includes sensing a current engine speed of the internal combustion engine, and identifying a potential engine stall event during which the current engine speed of the internal combustion engine drops below the engine underspeed value by a predetermined amount. The torque load limit signal is adjusted responsive to the identification of the potential engine stall event to generate an adjusted torque load limit signal, and at least one of the internal combustion engine and the plurality of torque consuming devices is controlled based on the adjusted torque load limit signal to regulate the engine torque load on the internal combustion engine.

BRIEF DESCRIPTION OF THE DRAWINGS

FIG. 6 is an exemplary trigger speed map relating trigger speed threshold values to engine underspeed values and actual gear ratios, according to another aspect of the present disclosure;

FIG. 7 is an exemplary step speed map relating step speed threshold values to engine underspeed values and actual gear ratios, according to another aspect of the present disclosure;

FIG. 8 is an exemplary recovered speed map relating recovered speed threshold values to engine underspeed values and actual gear ratios, according to another aspect of the present disclosure;

FIG. 9 is an exemplary rate limit table relating maximum rate limit values to engine underspeed values, according to another aspect of the present disclosure;

FIG. 10 is an exemplary rate limit table relating increasing rate limit values for a drive system torque load limit to engine underspeed values, according to another aspect of the present disclosure; and FIG. 11 is an exemplary rate limit table relating increasing rate limit values for an implement system torque load limit to engine underspeed values, according to another aspect of the present disclosure.

DETAILED DESCRIPTION

Figure 1:
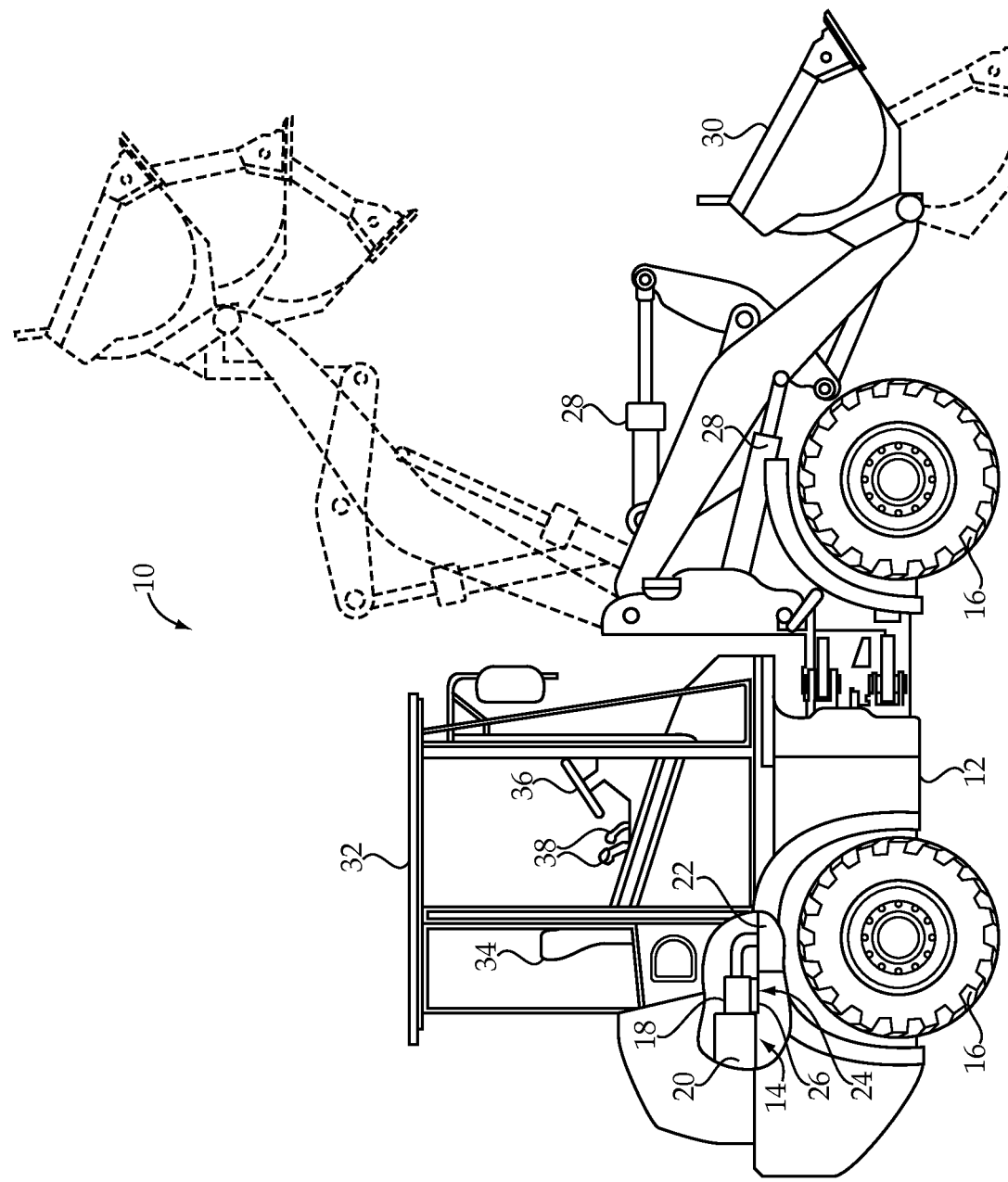
FIG. 1 is a side diagrammatic view of a machine having a continuously variable transmission, according to the present disclosure.

An exemplary embodiment of a machine 10 is shown generally in FIG. 1. The machine 10 may be a wheel loader, as shown, or any other off-highway or on-highway vehicle having a continuously variable transmission. Although the application is widely applicable to any machine having a continuously variable transmission, a machine having a hydrostatic drive system is shown. As such, machine 10 may also be referenced herein as a hydrostatic drive machine or, more specifically, a hydrostatic drive wheel loader. In the illustrated embodiment, machine 10 generally includes a frame 12 having a hydrostatic drive system 14 supported thereon for driving ground engaging elements 16, such as wheels (shown) or tracks, of the machine 10. A strategy presented herein for controlling engine torque load may be widely applicable to a machine having any continuously variable transmission and, therefore, it should be appreciated that the specific embodiments provided are presented for exemplary purposes only.

The hydrostatic drive system 14 may generally include at least one pump 18, such as a hydraulic pump, driven by a prime mover, such as a compression or spark-ignited internal combustion engine 20 or electric motor, of the machine 10. The pump 18 may be configured to drive at least one motor 22, such as one or more sets of hydraulic motors, which, in turn, power the ground engaging elements 16 of the machine 10. Each of the pump 18 and motor 22 may provide variable displacement, such that a fluid flow between the components of the hydrostatic drive system 14 may be adjusted while the machine 10 is running. As a result, direction, speed, and torque of the ground engaging elements 16, or wheels, may be continuously varied.

The machine 10 may also include an implement system 24 including at least one pump 26, such as a hydraulic pump, that is also driven by the internal combustion engine 20. As should be appreciated, the pump 26 may generate pressurized fluid that is circulated along a fluid circuit, which includes control cylinders 28, to effect a desired movement of an implement 30, such as a bucket, of the machine 10. It should be appreciated that the implement system 24 may include additional components known in the art, such as, for example, fluid reservoirs, additional pumps, electronically actuated valves, filters, sensors, and the like for facilitating desired operation. The engine torque load control strategy presented herein is widely applicable to machines having a variety of engine loads and, thus, the implement system 24 is provided for exemplary purposes only.

An operator control station 32 may also be supported on the frame 12 and may include various controls and devices that may be used by an operator of the machine 10. For example, the operator control station 32 may include known devices, such as a seat assembly 34, a steering device 36, and one or more machine operation controllers 38. According to a specific example, a first machine operation controller 38 may be provided for controlling directional movement of the machine 10, while a second machine operation controller 38 may be provided for controlling operation of the implement 30. The operator control station 32 may include additional machine controllers, such as controllers for controlling the engine speed, gear ratio, rim pull, and the like.

Figure 2:
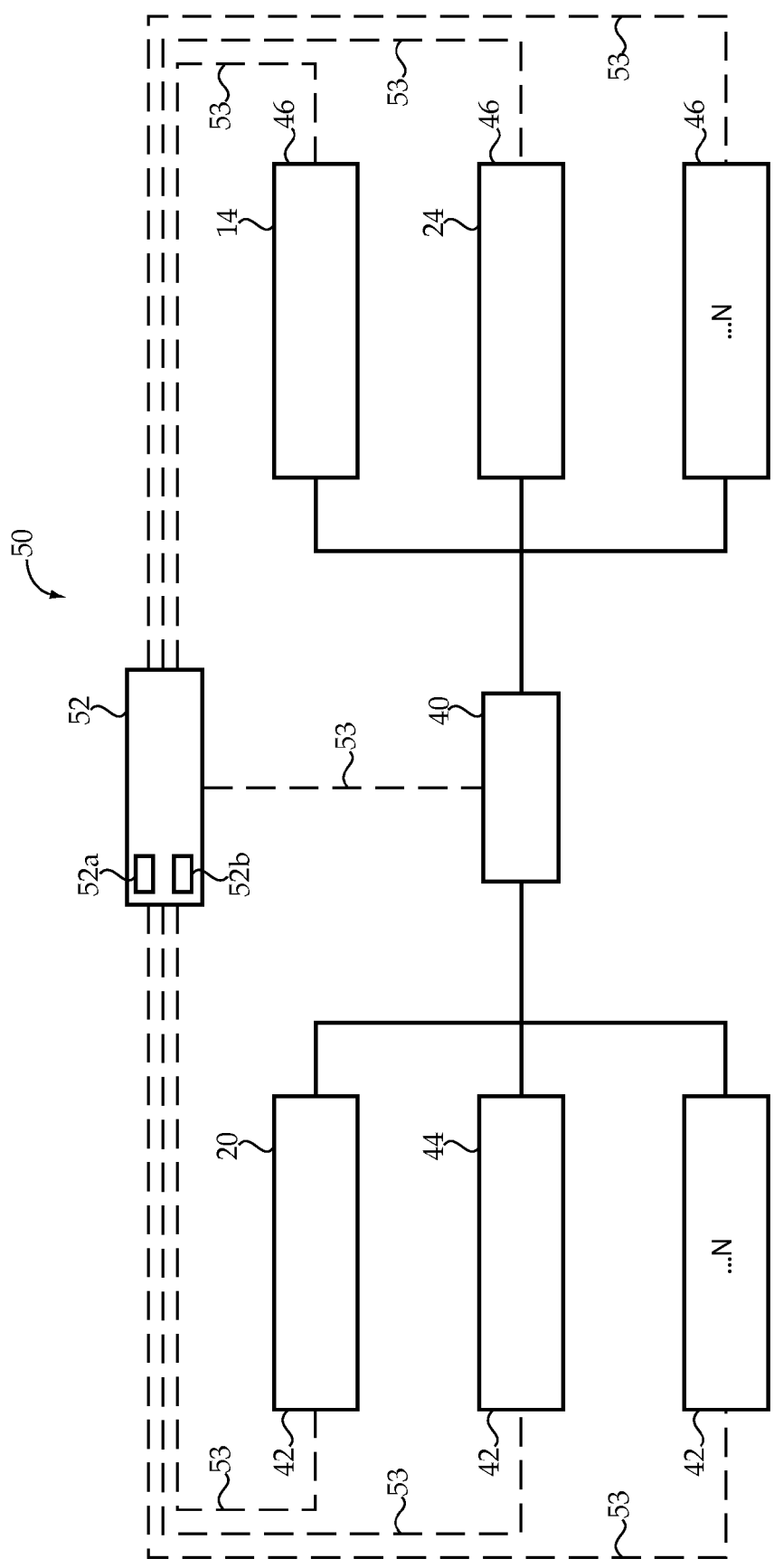
FIG. 2 is a control system schematic of the machine of FIG. 1 including exemplary torque producing devices and torque consuming devices, according to an exemplary embodiment of the present disclosure.

It should be appreciated that the internal combustion engine 20 is configured to combust fuel in one or more combustion chambers to reciprocate pistons within respective chambers. Each piston is connected to a common crankshaft through a connecting rod, such that the reciprocating movement of the pistons turns the crankshaft. Thus, the linear movement of the pistons is translated into rotational motion, which may be delivered to output 40, which may include a rotating shaft. In addition to the internal combustion engine 20, the machine 10 may include a plurality of additional torque producing devices 42 or systems configured to rotate the output 40, as shown in FIG. 2. For example, a secondary internal combustion engine 44 and/or any other suitable power source may also be configured to generate, store, accumulate, and or distribute torque. The one or more additional devices, like the internal combustion engine 20, may be operatively coupled to the output 40 such that they help rotate the output 40.

Referring still to FIG. 2, the machine 10 may also include one or more torque consuming devices 46. The torque consuming devices 46 may include any device or system of the machine 10 configured to transform an input, such as torque from output 40, into an output, such as movement of the ground engaging devices 16, the implement 30, and/or any other change in the state of the machine 10. For example, the torque consuming devices 46 may specifically include the drive system 14 and the implement system 24 described above with reference to FIG. 1. In particular, the internal combustion engine 20 may provide output torque used to operate pump 18 of the drive system 14 and pump 26 of the implement system 24. Additional, and/or alternative, torque consuming devices 46 that are drivingly coupled to the internal combustion engine 20 are also applicable to the engine torque load control strategy provided herein.

A control system 50 may include at least one electronic controller 52 configured to control operation of the machine 10. Although a single electronic controller 52 is described, it should be appreciated that the control system 50 may include a plurality of electronic controllers. For example, additional electronic controllers may be provided for controlling different subsystems of the machine 10. As such, each electronic controller of the control system 50 may be configured to communicate laterally and/or in a hierarchical manner. Therefore, it should be appreciated that a variety of control systems, ranging from simple to complex, are contemplated for use with the present disclosure.

The electronic controller 52 may be of standard design and may include a processor 52a, such as, for example, a central processing unit, a memory 52b, and an input/output circuit that facilitates communication internal and external to the electronic controller 52. The processor 52a may control operation of the electronic controller 52 by executing operating instructions, such as, for example, computer readable program code stored in memory 52b, wherein operations may be initiated internally or externally to the electronic controller 52. A control scheme, an example of which is provided below, may be utilized that monitors outputs of systems or devices, such as, for example, sensors, actuators, or control units, via the input/output circuit to control inputs to various other systems or devices.

The memory 52b may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 52. One skilled in the art will appreciate that any computer based system or device utilizing similar components for controlling the components or subsystems of the machine 10, is suitable for use with the present disclosure.

As shown, the electronic controller 52 may be in communication with each of the torque producing devices 42, output 40, and torque consuming devices 46 via communication lines 53. For example, the electronic controller 52 may be in communication with the internal combustion engine 20 to control a speed thereof, such as, for example, by issuing control commands via communication lines 53 to control fueling to the internal combustion engine 20. The engine speed may be adjusted, at least in part, based on a position of one or more machine operation controllers 38. As should be appreciated, the electronic controller 52 may also receive input from various sensors or devices monitoring operating conditions of the internal combustion engine 20. Such devices and means for controlling operation of the internal combustion engine 20 are known and, thus, will not be discussed in greater detail herein.

The electronic controller 52 may also be in communication with the variable displacement pump 18 and the variable displacement motors 22. More specifically, for example, the electronic controller 52 may be in communication with the variable displacement pump 18 to adjust the swash plate angle thereof, resulting in the variable displacement described above. According to one embodiment, a pump displacement solenoid, such as a proportional solenoid, may be provided for varying the swash plate angle and controlling the direction of fluid flow. However, various means for adjusting displacement and fluid flow are known and may be incorporated into the present disclosure. Accordingly, the electronic controller 52 may issue pump displacement commands and/ or additional commands, via wired or wireless communication lines 53, to the variable displacement pump 18 to effectively control the displacement and direction of fluid flow of the variable displacement pump 18. Similarly, the electronic controller 52 may be in communication with the variable displacement motors 22 to adjust angles of the swash plates of the motors 22. As stated above, devices for controlling displacement and fluid flow are generally known and, therefore, will not be discussed herein in greater detail.

The electronic controller 52 may also be in communication with additional torque consuming devices 46, including the implement system 24, to similarly monitor and control operation thereof. For example, the electronic controller may be in communication with the implement pump 26, which may include a variable displacement or fixed displacement pump, to monitor and control operation of the implement system 24 in a known manner. As should be appreciated, the implement 30 may be controlled, at least in part, based on a position of one or more of the machine operation controllers 38.

The torque consuming devices 46, including the drive system 14 and implement system 24, may take torque from the output 40 as it is rotated by one or more torque producing devices 42, such as the internal combustion engine 20, and, thus, may act as a torque load on the internal combustion engine 20. The torque requirements of the torque consuming devices 46 may be relatively constant, or may vary over time depending on the operations being performed. As torque consuming devices 46 take or use torque from the output 40, they may have an effect on the internal combustion engine 20. For example, when the torque required by the torque consuming devices 46 increases, the torque load on the output 40 increases. The increase in torque load may slow the angular speed of the output 40, and thus, the speed of the internal combustion engine 20 may decrease.

The internal combustion engine 20 may have an engine underspeed value, which may be lower than a desired engine speed value selected by the operator. According to some embodiments, it may be desirable to maintain the speed of the internal combustion engine 20 at or above the engine underspeed value to provide the operator with desired performance characteristics, including the perception of consistent and adequate engine power. The engine underspeed value may also represent an engine speed threshold below which excessive engine speed lugging may be a problem. Further, if the engine speed falls below the engine underspeed value a predetermined amount, engine stalling may also be a problem. Thus, for a number of reasons, it may be desirable to keep the internal combustion engine 20 at speeds equal to or above the engine underspeed value.

According to the exemplary embodiment, the engine underspeed value may be used in determining a torque load limit for the internal combustion engine 20. The torque load limit may be indicative of a torque load that can be placed on the internal combustion engine 20 without causing the speed of the engine 20 to fall below its engine underspeed value. Adjusting the operational parameters of machine 10 and/or the torque load on the output 40 based on the torque load limit may make the internal combustion engine 20 less susceptible to stalling.

An exemplary torque load control strategy is taught by U.S. Patent Application Publication No. 2009/0319136 to Anderson et al., which is hereby incorporated by reference. In particular, the torque load control strategy provided in the Anderson et al. reference teaches the use of a calculated torque load limit to allocate or distribute engine torque between torque consuming devices, such as torque consuming devices 46. In particular, operation of the torque consuming devices may be controlled or adjusted in response to the torque load limits. For example, if the torque load limit for a torque consuming device is less than the torque requested by the torque consuming device, operation of the torque consuming device may be delayed or restricted until additional torque becomes available.

Figure 3:
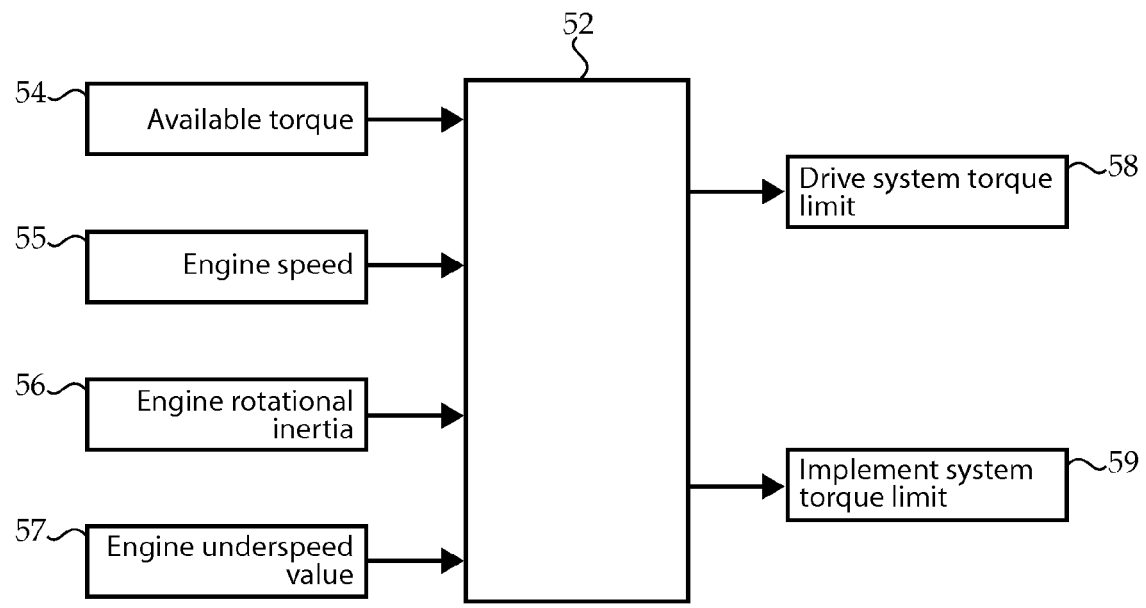
FIG. 3 is exemplary control system logic corresponding to an exemplary torque load control algorithm, according to one aspect of the present disclosure.

Thus, according to a torque load control strategy similar to the strategy taught in the Anderson et al. reference, the control system 50 may execute a torque load control algorithm for generating a torque load limit. For example, as shown in FIG. 3, the electronic controller 52 may receive as inputs an available torque 54, an engine speed 55, an engine rotational inertia 56, and an engine underspeed value 57, and may perform calculations to arrive at a drive system torque limit 58, or torque load limit signal, and an implement system torque limit 59, or torque load limit signal. It should be appreciated that additional, and/or alternative inputs, may be provided and used by the electronic controller 52 to arrive at one or more torque load limit values. The exemplary torque limits 58 and 59 may be used by the control system 50 to control operation of the machine 10 such that the internal combustion engine 20 operates at or above a particular threshold, such as the engine underspeed value 57, to reduce excessive engine speed lug and provide the desired operator feedback described above.

Figure 4:
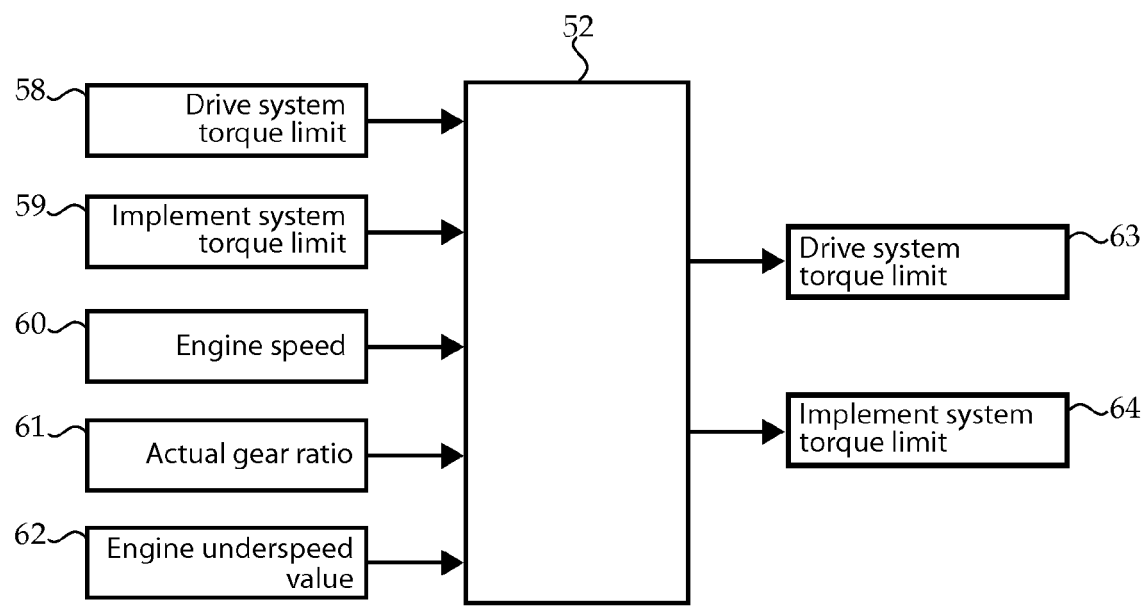
FIG. 4 is exemplary control system logic corresponding to an exemplary transient torque load control algorithm, according to another aspect of the present disclosure.

Turning now to FIG. 4, the control system 50 may also be configured to execute a transient torque load control algorithm to adjust a torque load limit, such as the torque load limits 58 and 59 generated above, during potential engine stall events. In particular, the electronic controller 52 may receive as inputs the drive system torque limit 58, the implement system torque limit 59, a current engine speed 60, an actual gear ratio 61 of the drive system 14, and an engine underspeed value 62. The electronic controller 52 then performs operations, such as according to the exemplary methodology described below, to arrive at an adjusted drive system torque limit 63, or torque load limit signal, and an adjusted implement system torque limit 64, or torque load limit signal. The adjusted torque limits 63 and 64 may then be used by the control system 50 to control operation of the machine 10 in a manner described above to reduce engine stalling during potential engine stall events.

Figure 5:
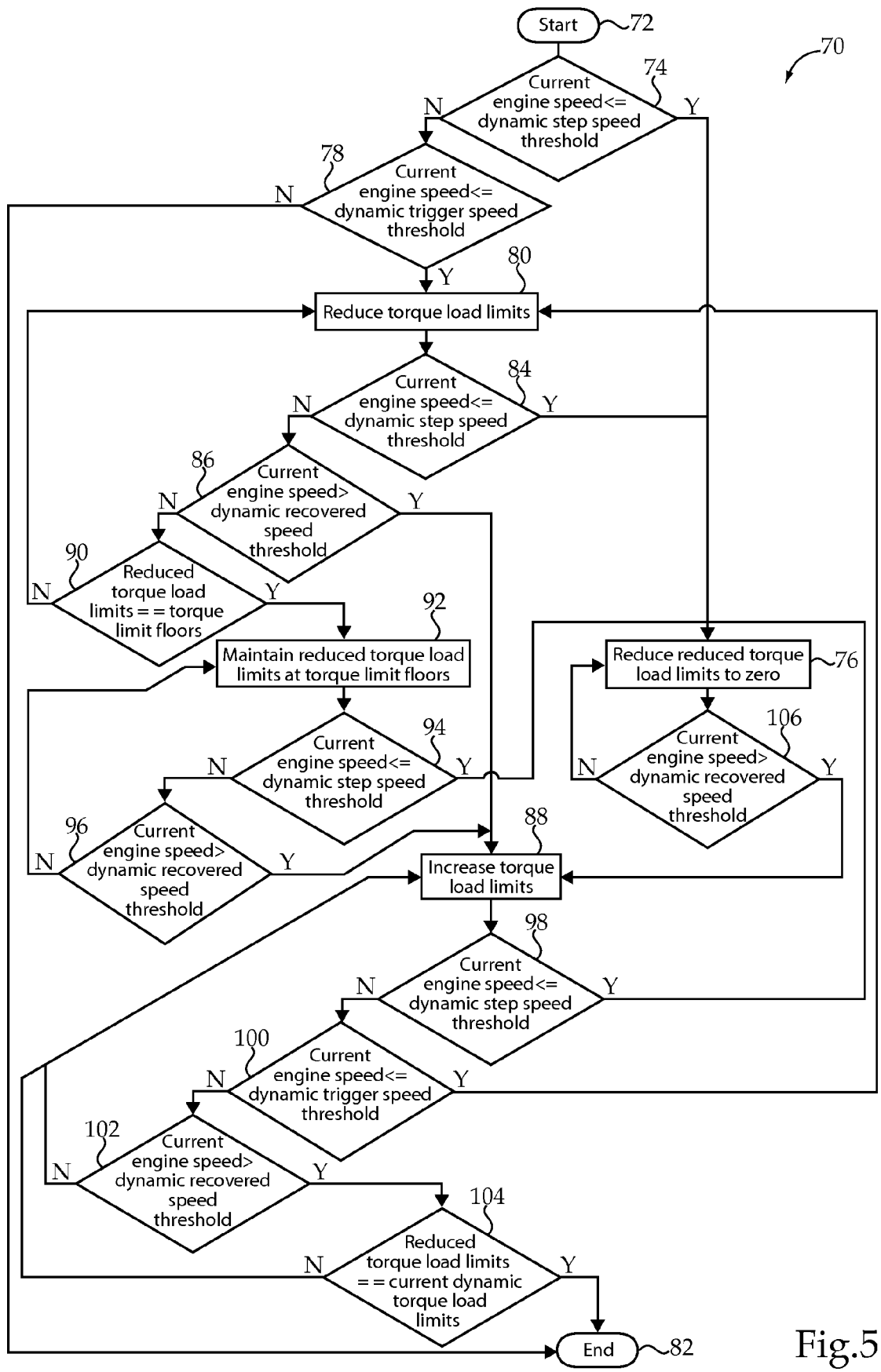
FIG. 5 is a logic flow chart of one embodiment of a method for controlling engine torque load according to the exemplary transient torque load control algorithm, according to another aspect of the present disclosure.

Turning to FIG. 5, there is shown a flow chart 70 representing an exemplary method for controlling engine torque load in the machine 10 according to the present disclosure. In particular, the method may represent a strategy for adjusting the torque load limits 58 and 59, which are dynamic and based, at least in part, on the engine underspeed value 57 and may be generated by the torque load control algorithm described above. The method may be implemented by the control system 50 of the machine 10. According to one example, the steps implementing the disclosed method may be in the form of computer readable program code stored in memory 52b and executed by the processor 52a of the electronic controller 52, or other computer usable medium. The method may run continuously or may be initiated in response to a predetermined event. For example, the transient torque load control algorithm may be initiated in response to the identification of a potential engine stall event.

The method begins at a START, Box 72. From Box 72, the method proceeds to Box 74, which includes the electronic controller 52 comparing the current engine speed 60 to a dynamic step speed threshold, which will be discussed below with reference to FIG. 7. If the current engine speed 60 has dropped below the dynamic step speed threshold, the method proceeds to Box 76. Otherwise, if the current engine speed 60 is greater than the dynamic step speed threshold, the method proceeds to Box 78. At Box 78, the electronic controller 52 compares the current engine speed 60 to a dynamic trigger speed threshold, which will be discussed below with reference to FIG. 6. If the current engine speed 60 has dropped below the dynamic trigger speed threshold, the method proceeds to Box 80. Otherwise, if the current engine speed 60 is above the dynamic trigger speed threshold, the method proceeds to an END, at Box 82.

At Box 80, the electronic controller 52 will reduce the drive system torque limit 58 and the implement system torque limit 59, such as based on a configurable rate, to reduced torque limits 63 and 64. For example, the torque limits 58 and 59 may be reduced at a constant rate, such as, for example, 5% or less of reference torque per processor loop, when the current engine speed 60 falls below the dynamic trigger speed threshold. After reducing the torque limits 58 and 59, the method next proceeds to Box 84, which includes the electronic controller 52 again comparing the current engine speed 60 to the dynamic step speed threshold. If the current engine speed 60 has dropped below the dynamic step speed threshold, the method proceeds to Box 76. Otherwise, if the current engine speed 60 is greater than the dynamic step speed threshold, the method proceeds to Box 86. At Box 86, the electronic controller 52 compares the current engine speed 60 to a dynamic recovered speed threshold, which will be discussed below with reference to FIG. 8. If the current engine speed 60 has increased above the dynamic recovered speed threshold, the method proceeds to Box 88. Otherwise, if the current engine speed 60 remains below the dynamic trigger speed threshold, the method proceeds to Box 90.

At Box 90, the electronic controller 52 determines whether the reduced torque load limits 63 and 64 have reached a torque limit floor, which may be a non-zero torque limit value. The torque limit floor may be a configurable parameter that is selected to provide a desired minimal torque limit amount. For example, the torque limit floor may be selected to greatly reduce the torque loads on the internal combustion engine 20, without completely removing all torque loads. If the reduced torque load limits 63 and 64 have been reduced to the torque limit floor, the method proceeds to Box 92. Otherwise, the method will return to Box 80, where the electronic controller 52 will continue to reduce the reduced torque limits 63 and 64 until the torque limit floor has been reached, the current engine speed 60 drops below the dynamic step speed threshold, or the current engine speed 60 increases above the dynamic recovered speed threshold. At Box 92, the reduced torque limits 63 and 64 will be maintained at the torque limit floor while the current engine speed 60 remains between the dynamic trigger speed threshold and the dynamic step speed threshold.

If the current engine speed 60 drops below the dynamic step speed threshold, at Box 94, the method proceeds to Box 76. Alternatively, if the current engine speed 60 rises above the dynamic recovered speed threshold, as compared at Box 96, the method proceeds to Box 88. At Box 88, in response to the current engine speed 60 increasing above the dynamic recovered speed threshold, the electronic controller 52 increases the reduced torque limits 63 and 64, such as based on a configurable rate, which will be discussed below. The method will continue to increase the torque limits 58 and 59, or reduced torque limits 63 and 64, until a certain monitored condition occurs.

Specifically, if the current engine speed 60 falls below the dynamic step speed threshold, as compared at Box 98, the method returns to Box 76. If the current engine speed 60 falls below the dynamic trigger speed threshold, as compared at Box 100, the method returns to Box 80. The current engine speed 60 will again be compared to the dynamic recovered speed threshold at Box 102, and, if the current engine speed 60 remains below the dynamic recovered speed threshold, the electronic controller 52 continues to recover, at Box 88. Once the current engine speed 60 increases above the dynamic recovered speed threshold, the reduced torque limits 63 and 64 are compared to the current dynamic torque load limits 58 and 59, at Box 104. If the reduced torque load limits 63 and 64 have not yet returned to the current dynamic torque load limits 58 and 59, the method returns to Box 88. Otherwise, if the reduced torque load limits 63 and 64 have returned to the current dynamic torque load limits 58 and 59, the method proceeds to the END, at Box 82.

If the current engine speed 60 drops below the dynamic step speed threshold at any point, the method proceeds to Box 76, where the torque load limits 58 and 59, or the reduced torque load limits 63 and 64, are reduced to zero or a negative value. Alternatively, however, the reduced torque load limits 63 and 64 may be reduced to relatively low positive values, which are less than the torque limit floor. The torque load limits 58 and 59 or reduced torque load limits 63 and 64 will remain at the zero or negative value, or relatively low positive value, until the current engine speed 60 increases above the dynamic recovered speed threshold. Once the current engine speed 60 increases above the dynamic recovered speed threshold, as compared at Box 106, the reduced torque load limits 63 and 64 are increased, at Box 88. As stated above, the reduced torque load limits 63 and 64 are increased until the limits 63 and 64 have returned to the current dynamic torque load limits 58 and 59.

Dynamic trigger speed thresholds, dynamic step speed thresholds, and dynamic recovered speed thresholds, as referenced above, may be stored in memory 52*b* and may be provided for particular engine underspeed values and actual gear ratios of the machine 10. For example, FIG. 6 depicts an electronically stored trigger speed map 110 relating dynamic trigger speed threshold values 112 to engine underspeed values 114 and actual gear ratios 116. Thus, the electronic controller 52 may receive as input the current engine speed 60 and actual gear ratio 61, which may represent current ground speed of the machine 10 and may be calculated as a function of pump displacement divided by motor displacement, and may select a dynamic trigger speed threshold corresponding to the input values 60 and 61. As shown, the dynamic trigger speed threshold values 112 in the electronically stored trigger speed map 110 may deviate less from a corresponding engine underspeed value 114 as the engine underspeed value 114 decreases. Further, the dynamic trigger speed threshold values 112 in the electronically stored trigger speed map 110 may deviate less from a corresponding engine underspeed value 114 as the actual gear ratio 116 increases. As such, the transient torque load control algorithm may be more active at lower engine underspeed values and higher gear ratios.

FIG. 7 depicts an electronically stored step speed map 120 relating dynamic step speed threshold values 122 to engine underspeed values 124 and actual gear ratios 126, while FIG. 8 depicts an electronically stored recovered speed map 130 relating dynamic recovered speed threshold values 132 to engine underspeed values 134 and actual gear ratios 136. It should be appreciated that the values reflected in the tables 110, 120, and 130 are provided for exemplary purposes only. The values are configurable and may be arrived at through testing in order to provide desired responsiveness of the transient torque load control algorithm provided herein.

According to some embodiments, it may be desirable to apply a rate limiting value to each of the values provided in the maps 110, 120, and 130. For example, referring to FIG. 9, a rate limit table 140 may be provided including maximum rate limit values 142, provided in revolutions per minute (rpms) per processor loop, corresponding to particular engine underspeed values 144. The maximum rate limit values 142 may be applied to each of the electronically stored maps 110, 120, and 130 described above and, as shown, may require slower rate limit increases at higher engine underspeed values 144 such that the speeds reflected in the maps 110, 120, and 130 are not increased too quickly during an acceleration. As should be appreciated, a minimum rate limit may also be provided, such as for example, a minimum rate limit of −50 rpms per processor loop.

As stated above, the torque limits 58 and 59 may be reduced at a constant rate, such as, for example, 5% or less of reference torque per processor loop, when the current engine speed 60 falls below the dynamic trigger speed threshold. However, it may be desirable to increase the reduced torque limits 63 and 64 at a rate dependent on particular engine underspeed values. For example, and referring to FIG. 10, a table 150 may be provided that includes increasing rate limits 152 corresponding to particular engine underspeed values 154 for the drive system 14. Similarly, a table 160, depicted in FIG. 11, may be provided that includes increasing rate limits 162 corresponding to particular engine underspeed values 164 for the implement system 24. For example, it may be desirable to prevent the torque loads from coming back on too quickly.

The transient torque load control strategy provided herein may include additional features for adjusting the torque limits 58 and 59 during a potential engine stall event, which is characterized by the engine speed falling below an engine underspeed value a predetermined amount. According to one example, the strategy may also include logic to ensure the dynamic recovered speed threshold is greater than the dynamic trigger speed threshold, which is greater than the dynamic step speed threshold. Further, the exemplary data provided herein may be modified based on desired performance of the machine 10.

Industrial Applicability

The present disclosure finds potential application in any machine that includes one or more torque producing devices configured to produce torque for one or more torque consuming devices, including a continuously variable transmission. Further, the present disclosure may be specifically applicable to machines utilizing torque load limits to control operation of the torque producing devices and/or torque consuming devices. Yet further, the disclosure may be applicable to control strategies for further limiting the torque load limits responsive to an identification of a potential engine stall event.

Referring generally to FIGS. 1-11, a machine 10 may include one or more torque producing systems 42, including an internal combustion engine 20, producing torque through an output 40 to one or more torque consuming devices 46, including a drive system 14 and an implement system 24. A control system 50, including at least one electronic controller 52, may be provided for controlling an engine torque load of the machine 10. In particular, the control system 50 may execute a torque load control algorithm for generating torque load limits 58 and 59 based, at least in part, on an engine underspeed value 57. The torque load limits 58 and 59 are indicative of a torque load that can be placed on the internal combustion engine 20 without causing the speed of the engine 20 to fall below the engine underspeed value 57. It should be appreciated that such a control strategy may be running during the majority of the operation of the machine 10 to produce one or more torque load signals for regulating engine torque load. For example, the internal combustion engine 20 and/or the torque consuming devices 46 may be controlled based on the torque load limit signals 58 and 59 to regulate the engine torque load.

Under certain operating conditions, however, the engine 20 may still be susceptible to stalling. For example, during high transient load conditions, such as when the machine 10 drives into a pile of material and the implement 30 contacts the material, the torque load limits 58 and 59 may not be adjusted quickly enough to prevent an engine stall from occurring. In particular, a torque may be propagated from the torque output, at the wheels 16, back through the torque producing device output 40. This input torque, caused by an increase in drive pressure, is applied to the engine shaft, which may cause the engine speed to rapidly decrease. Such a scenario may represent a potential engine stall event.

When such a potential engine stall event is identified, such as by determining that the current engine speed 60 has dropped below the engine underspeed value 62 a predetermined amount, the transient torque load control strategy provided herein may be executed. Specifically, the method may monitor the current engine speed 60 and, when the current engine speed 60 drops below a corresponding dynamic trigger speed threshold selected from the electronically stored trigger speed map 110 or a corresponding dynamic step speed threshold selected from the electronically stored step speed map 120, the torque limits 58 and 59 may be reduced to reduced torque limits 63 and 64. In particular, the torque limits 58 and 59 may be reduced at a constant rate, such as, for example, 5% or less of reference torque per processor loop, when the current engine speed 60 falls below the dynamic trigger speed threshold. The electronic controller 52 will continue to reduce the reduced torque limits 63 and 64 until the torque limit floor has been reached, the current engine speed 60 drops below the dynamic step speed threshold, or the current engine speed 60 increases above the dynamic recovered speed threshold. The reduced torque limits 63 and 64 will be maintained at the torque limit floor while the current engine speed 60 remains between the dynamic trigger speed threshold and the dynamic step speed threshold.

If the current engine speed 60 drops below the dynamic step speed threshold at any point, the torque load limits 58 and 59, or the reduced torque load limits 63 and 64, are reduced to zero or a negative value. The torque load limits 58 and 59 or reduced torque load limits 63 and 64 will remain at the zero or negative value until the current engine speed 60 increases above the dynamic recovered speed threshold. When the current engine speed 60 rises above the dynamic recovered speed threshold, the electronic controller 52 increases the reduced torque limits 63 and 64 until the reduced torque limits 63 and 64 are returned to the current dynamic torque limits 58 and 59, which were calculated according to the torque load control algorithm discussed with reference to FIG. 3. As should be appreciated, the internal combustion engine 20 and/or the plurality of torque consuming devices 46 are controlled based on the adjusted torque load limit signals 63 and 64 to regulate the engine torque load.

The engine torque load control strategy provided herein includes the execution of a torque load control algorithm during a majority of the operation of a machine to generate torque load limits that assist in maintaining an appropriate torque distribution that may reduce engine stalling. The control strategy monitors engine speed to identify potential engine stall events and, when such an event is identified, executes a transient torque load control algorithm, in lieu of the torque load control algorithm, to adjust the torque load limits. For example, the torque load limits may be reduced at a configurable rate or dropped to zero to effectively reduce the torque loads during the potential engine stall event and bring the engine speed back toward the engine underspeed value. Such a strategy may be particularly applicable to machines utilizing continuously variable transmissions, where direct connections between the engine and the transmission are capable of producing high transient loads on the engine.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine, comprising:
   an internal combustion engine;
   a plurality of ground engaging elements;
   a plurality of torque consuming devices drivingly coupled with the internal combustion engine, wherein the plurality of torque consuming devices include a continuously variable transmission coupling the internal combustion engine and the ground engaging elements; and
   an electronic controller in communication with the internal combustion engine and the plurality of torque consuming devices, wherein the electronic controller is configured to:
      execute a torque load control algorithm for generating a torque load limit based, at least in part, on an engine underspeed value;
      identify a potential engine stall event during which a current engine speed of the internal combustion engine drops below the engine underspeed value by a predetermined amount; and
      execute a transient torque load control algorithm to adjust the torque load limit responsive to the identification of the potential engine stall event.

2. The machine of claim 1, wherein the electronic controller is further configured to:
   determine a dynamic trigger speed threshold based on the engine underspeed value and an actual gear ratio of the continuously variable transmission;
   compare the current engine speed to the dynamic trigger speed threshold; and
   execute the transient torque load control algorithm if the current engine speed is less than the dynamic trigger speed threshold.

3. The machine of claim 2, wherein the transient torque load control algorithm reduces the torque load limit to a non-zero value if the current engine speed is less than the dynamic trigger speed threshold.

4. The machine of claim 2, wherein the electronic controller is further configured to:
   determine a dynamic step speed threshold based on the engine underspeed value and the actual gear ratio, wherein the dynamic step speed threshold is less than the dynamic trigger speed threshold; and
   compare the current engine speed to the dynamic step speed threshold;
   wherein the transient torque load control algorithm reduces the torque load limit to zero or a negative value if the current engine speed is less than the dynamic step speed threshold.

5. The machine of claim 4, wherein the electronic controller is further configured to:
   determine a dynamic recovered speed threshold based on the engine underspeed value and the actual gear ratio, wherein the dynamic recovered speed threshold is greater than both of the dynamic trigger speed threshold and the dynamic step speed threshold; and
   compare the current engine speed to the dynamic recovered speed threshold;
   wherein the transient torque load control algorithm increases the torque load limit if the current engine speed is greater than the dynamic recovered speed threshold.

6. The machine of claim 5, wherein the transient torque load control algorithm increases the torque load limit at a rate that increases as the engine underspeed value increases.

7. The machine of claim 2, wherein the electronic controller is further configured to select the dynamic trigger speed threshold from an electronically stored trigger speed map, wherein the electronically stored trigger speed map includes dynamic trigger speed threshold values mapped to engine underspeed values and actual gear ratio values.

8. The machine of claim 7, wherein the dynamic trigger speed threshold values in the electronically stored trigger speed map deviate less from a corresponding engine underspeed value as the engine underspeed values decrease and the actual gear ratio values increase.

9. A computer readable medium for use by an electronic controller for a machine, the machine including a plurality of torque consuming devices drivingly coupled with an internal combustion engine, wherein the plurality of torque consuming devices include a continuously variable transmission coupling the internal combustion engine and ground engaging elements of the machine, the computer readable medium having executable instructions for performing a method of controlling engine torque load, the method comprising:

executing a torque load control algorithm for generating a torque load limit based, at least in part, on an engine underspeed value;

identifying a potential engine stall event during which a current engine speed of the internal combustion engine drops below the engine underspeed value by a predetermined amount; and executing a transient torque load control algorithm to adjust the torque load limit responsive to the identification of the potential engine stall event.

10. The computer readable medium of claim 9, wherein the method further includes:

determining a dynamic trigger speed threshold based on the engine underspeed value and an actual gear ratio of the continuously variable transmission;

comparing the current engine speed to the dynamic trigger speed threshold; and executing the transient torque load control algorithm if the current engine speed is less than the dynamic trigger speed threshold.

11. The computer readable medium of claim 10, wherein executing the transient torque load control algorithm includes reducing the torque load limit to a non-zero value if the current engine speed is less than the dynamic trigger speed threshold.

12. The computer readable medium of claim 10, wherein the method further includes:

determining a dynamic step speed threshold based on the engine underspeed value and the actual gear ratio, wherein the dynamic step speed threshold is less than the dynamic trigger speed threshold; and comparing the current engine speed to the dynamic step speed threshold;

wherein executing the transient torque load control algorithm includes reducing the torque load limit to zero or a negative value if the current engine speed is less than the dynamic step speed threshold.

13. The computer readable medium of claim 12, wherein the method further includes:

determining a dynamic recovered speed threshold based on the engine underspeed value and the actual gear ratio, wherein the dynamic recovered speed threshold is greater than both of the dynamic trigger speed threshold and the dynamic step speed threshold; and comparing the current engine speed to the dynamic recovered speed threshold;

wherein executing the transient torque load control algorithm includes increasing the torque load limit if the current engine speed is greater than the dynamic recovered speed threshold.

14. The computer readable medium of claim 13, wherein executing the transient torque load control algorithm includes increasing the torque load limit at a rate that increases as the engine underspeed value increases.

15. The computer readable medium of claim 10, wherein the method further includes selecting the dynamic trigger speed threshold from an electronically stored trigger speed map, wherein the electronically stored trigger speed map includes dynamic trigger speed threshold values mapped to engine underspeed values and actual gear ratio values.

16. A method of controlling engine torque load on an internal combustion engine of a machine, the machine including a plurality of torque consuming devices drivingly coupled with the internal combustion engine, wherein the plurality of torque consuming devices include a continuously variable transmission coupling the internal combustion engine and ground engaging elements of the machine, the method comprising:

generating a torque load limit signal based, at least in part, on an engine underspeed value;

controlling at least one of the internal combustion engine and the plurality of torque consuming devices based on the torque load limit signal to regulate the engine torque load on the internal combustion engine;

sensing a current engine speed of the internal combustion engine;

identifying a potential engine stall event during which the current engine speed of the internal combustion engine drops below the engine underspeed value by a predetermined amount;

adjusting the torque load limit signal responsive to the identification of the potential engine stall event to generate an adjusted torque load limit signal; and controlling at least one of the internal combustion engine and the plurality of torque consuming devices based on the adjusted torque load limit signal to regulate the engine torque load on the internal combustion engine.

17. The method of claim 16, wherein the potential engine stall event is identified when the current engine speed drops below a dynamic trigger speed threshold, wherein the dynamic trigger speed threshold is based on the engine underspeed value and an actual gear ratio of the continuously variable transmission.

18. The method of claim 17, wherein the adjusted torque load limit signal corresponds to zero or a negative value when the current engine speed drops below a dynamic step speed threshold, wherein the dynamic step speed threshold is based on the engine underspeed value and the actual gear ratio, wherein the dynamic step speed threshold is less than the dynamic trigger speed threshold.

19. The method of claim 18, wherein the adjusted torque load limit signal is increased when the current engine speed increases above a dynamic recovered speed threshold, wherein the dynamic recovered speed threshold is based on the engine underspeed value and the actual gear ratio, wherein the dynamic recovered speed threshold is greater than both of the dynamic trigger speed threshold and the dynamic step speed threshold.

20. The method of claim 19, wherein the adjusted torque load limit signal is increased at a rate that increases as the engine underspeed value increases.

* * * * *